(12) United States Patent
Iwaguchi et al.

(10) Patent No.: US 9,891,381 B2
(45) Date of Patent: Feb. 13, 2018

(54) COATED OPTICAL FIBER

(71) Applicant: SUMITOMO ELECTRIC INDUSTRIES, LTD., Osaka-shi, Osaka (JP)

(72) Inventors: Noriaki Iwaguchi, Yokohama (JP); Masuo Iida, Osaka (JP); Kumiko Tachibana, Yokohama (JP); Takashi Takada, Yokohama (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 117 days.

(21) Appl. No.: 14/397,983

(22) PCT Filed: Apr. 10, 2014

(86) PCT No.: PCT/JP2014/060394
§ 371 (c)(1),
(2) Date: Oct. 30, 2014

(87) PCT Pub. No.: WO2014/168201
PCT Pub. Date: Oct. 16, 2014

(65) Prior Publication Data
US 2015/0131956 A1    May 14, 2015

(30) Foreign Application Priority Data

Apr. 12, 2013 (JP) .................................. 2013-084093

(51) Int. Cl.
C08J 3/28 (2006.01)
C08F 2/52 (2006.01)
G02B 6/036 (2006.01)
C03C 25/24 (2006.01)
G02B 6/02 (2006.01)
C03C 25/10 (2006.01)
C03C 25/28 (2006.01)
C03C 25/32 (2006.01)

(52) U.S. Cl.
CPC ...... *G02B 6/03694* (2013.01); *C03C 25/1065* (2013.01); *C03C 25/24* (2013.01);
(Continued)

(58) Field of Classification Search
CPC . G02B 6/03694; C03C 25/1065; C03C 25/24; C08J 3/28; C08F 2/52; C08G 69/48
(Continued)

(56) References Cited

U.S. PATENT DOCUMENTS 5,945,173 A    8/1999 Hattori et al.
6,075,065 A *  6/2000 Yamazaki ............. C03C 25/106
                                           522/28
(Continued)

FOREIGN PATENT DOCUMENTS

CN    101312923 A    11/2008
CN    102958967 A    3/2013
(Continued)

*Primary Examiner* — Sanza McClendon
(74) *Attorney, Agent, or Firm* — Drinker Biddle & Reath LLP (57) ABSTRACT

Provided is a coated optical fiber excellent in both characteristics of the microbending loss resistance and the low-temperature characteristic. The coated optical fiber 1 comprises an optical fiber 10 that has a cladding layer composed of glass formed on an outer periphery of a glass core, a primary coating layer 20 that coats an outer periphery of the optical fiber 10, and a secondary coating layer 30 that coats an outer periphery of the primary coating layer 20, wherein the primary coating layer 20 has a Young's modulus of 1.2 MPa or less, the secondary coating layer 30 has a Young's modulus of 700 MPa or more, and the primary coating layer 20 contains tin in a content of 70 ppm or less.

11 Claims, 2 Drawing Sheets

(52) U.S. Cl.
CPC .......... *C03C 25/285* (2013.01); *C03C 25/326* (2013.01); *G02B 6/02395* (2013.01)

(58) Field of Classification Search
USPC .................................................. 385/128–129
See application file for complete search history.

(56) References Cited

U.S. PATENT DOCUMENTS

| | | | |
|---|---|---|---|
| 6,849,333 B2* | 2/2005 | Schissel | ................ C03C 25/106 385/123 |
| 2009/0123749 A1 | 5/2009 | Ui et al. | |
| 2011/0059236 A1 | 3/2011 | Ui et al. | |
| 2012/0207439 A1 | 8/2012 | Okada | |
| 2012/0321270 A1 | 12/2012 | Imai et al. | |
| 2013/0315545 A1 | 11/2013 | Saito et al. | |
| 2014/0241687 A1 | 8/2014 | Imai et al. | |

FOREIGN PATENT DOCUMENTS

| | | | | |
|---|---|---|---|---|
| JP | H10-170787 A | | 6/1998 | |
| JP | H10-231340 A | | 9/1998 | |
| JP | 2002-338641 A | | 11/2002 | |
| JP | 2011-68559 A | | 4/2011 | |
| JP | 2011068559 A | * | 4/2011 | ............. C03C 25/24 |
| JP | 2012-162415 A | | 8/2012 | |
| JP | 2012-168310 A | | 9/2012 | |

\* cited by examiner

COATED OPTICAL FIBER

TECHNICAL FIELD

The present invention relates to a coated optical fiber having a primary coating layer and a secondary coating layer provided on an outer periphery of an optical fiber.

BACKGROUND ART

In a coated optical fiber, an optical fiber drawn from melted glass is coated with a resin for the purpose of protection and reinforcement. However, even when the coating resin is in a stabilized state after curing, a physical minute residual stress or residual strain may be generated in the coating resin due to a stress or strain newly loaded on the optical fiber in a process of rewinding, etc. or at the time when temperature changes. In the case where the distribution of this residual stress/strain in the optical fiber is non-uniform, a transmission loss, called a microbending loss may be generated in some cases.

As a method for preventing propagation of an external force causing such a microbending loss to an optical fiber, there is known a method of enhancing microbending loss resistance by decreasing the Young's modulus of a primary coating layer, which is in contact with the optical fiber, to impart a performance of a cushioning material while the Young's modulus of a secondary coating layer is made high to enhance rigidity.

For example, in Patent Document 1 relating to an optical fiber having the microbending loss resistance, it is disclosed that the Young's modulus of the primary coating layer is controlled to 0.55 MPa or less and the Young's modulus of the secondary coating layer is controlled to 500 to 1,500 MPa.

RELATED ART DOCUMENTS

Patent Document

Patent Document 1: JP-A-2012-162415

SUMMARY OF THE INVENTION

Problem to be Solved by the Invention

However, the coated optical fiber having physical properties described in Patent Document 1 is considered not to be problematic at ordinary temperature but deterioration in a transmission characteristic is anticipated at low temperature. When the Young's modulus of the secondary coating layer is increased and the Young's modulus of the primary coating layer is decreased for the purpose of enhancing the microbending loss resistance (suppress an increase in the transmission loss by microbending), a tensile stress received by the primary coating layer from the secondary coating layer increases in a low-temperature state and thus cracks (voids) in the primary coating layer tend to be generated. When the voids are generated in the primary coating layer, the transmission characteristic of the optical fiber is deteriorated. In order to prevent the voids in the primary coating layer, it is effective to enhance breaking strength of the primary coating layer but the enhancement in the breaking strength is accompanied by an increase in the Young's modulus. Therefore, the decrease in the Young's modulus and the enhancement in the breaking strength are in the relationship of trade-off and it is difficult for the coated optical fiber disclosed in Patent Document 1 to improve the low-temperature characteristic (decrease the increase in the transmission loss at low temperature) while the Young's modulus is maintained at an appropriate value. Thus, it is desired to further improve the balance between the microbending loss resistance and the low-temperature characteristic in the coated optical fiber.

The present invention is devised in view of the above problem in the conventional coated optical fiber and an object thereof is to provide a coated optical fiber excellent in both characteristics of the microbending loss resistance and the low-temperature characteristic.

Means for Solving the Problem

As a result of extensive studies for achieving the above object, the present inventors found that, for the improvement of the low-temperature characteristic, not only the Young's modulus but also the tin content in the primary coating layer are important. By optimizing them, the microbending loss resistance and the low-temperature characteristic can be both achieved and thus the present invention has been accomplished.

That is, the present invention is as follows:

[1] A coated optical fiber comprising an optical fiber that has a cladding layer composed of glass formed on an outer periphery of a glass core, a primary coating layer that coats an outer periphery of the optical fiber, and a secondary coating layer that coats an outer periphery of the primary coating layer, wherein the primary coating layer has a Young's modulus of 1.2 MPa or less, the secondary coating layer has a Young's modulus of 700 MPa or more, and the primary coating layer contains tin in a content of 70 ppm or less.

[2] The coated optical fiber according to the above [1], wherein the total tin content in the primary coating layer and the secondary coating layer is 70 ppm or less.

[3] The coated optical fiber according to the above [1], wherein the tin content in the primary coating layer is 50 ppm or less.

[4] The coated optical fiber according to the above [3], wherein the total tin content in the primary coating layer and the secondary coating layer is 50 ppm or less.

[5] The coated optical fiber according to any one of the above [1] to [4], wherein the Young's modulus of the primary coating layer is 1.0 MPa or less and the Young's modulus of the secondary coating layer is 800 MPa or more.

[6] The coated optical fiber according to any one of the above [1] to [5], wherein the Young's modulus of the primary coating layer is 0.80 MPa or less and the Young's modulus of the secondary coating layer is 900 MPa or more.

[7] The coated optical fiber according to any one of the above [1] to [6], wherein the primary coating layer is formed from an ultraviolet ray-curable resin composition containing at least one kind of an acylphosphine oxide-based photopolymerization reaction initiator and the secondary coating layer is formed from an ultraviolet ray-curable resin composition containing at least one kind of an acylphosphine oxide-based photopolymerization reaction initiator and an α-hydroxyacetophenone-type photopolymerization reaction initiator.

[8] The coated optical fiber according to the above [7], wherein the coating layer contains an unreacted acylphosphine oxide-based photopolymerization reaction initiator in an amount of 0.5% by mass or less.

[9] The coated optical fiber according to any one of the above [1] to [8], wherein the primary coating layer is formed from an ultraviolet ray-curable coating agent containing:

(A) a (meth)acryloyl group-containing urethane oligomer obtained by reacting an aliphatic polyol, an organic polyisocyanate, a hydroxyl group-containing (meth)acrylate, and a γ-mercaptopropyltrimethoxysilane;

(B) a reactive diluent; and (C) a photopolymerization reaction initiator.

[10] The coated optical fiber according to any one of the above [1] to [8], wherein the primary coating layer is formed from an ultraviolet ray-curable coating agent containing:

(A) a (meth)acryloyl group-containing urethane oligomer obtained by reacting an aliphatic polyol having a molecular weight of 3,500 or less, an organic polyisocyanate, a hydroxyl group-containing (meth)acrylate, and a γ-mercaptopropyltrimethoxysilane;

(B) at least one kind of a reactive diluent having a glass transition temperature of 0° C. or lower at the time of polymerization as a single substance; and (C) a photopolymerization reaction initiator.

Effect of the Invention

According to the present invention, by controlling the Young's moduli of the primary coating layer and the secondary coating layer and the tin content in the primary coating layer to specific value ranges, it is possible to provide a coated optical fiber excellent in both characteristics of the microbending loss resistance and the low-temperature characteristic.

MODES FOR CARRYING OUT THE INVENTION (Summary of Coated Optical Fiber)

Figure 1:
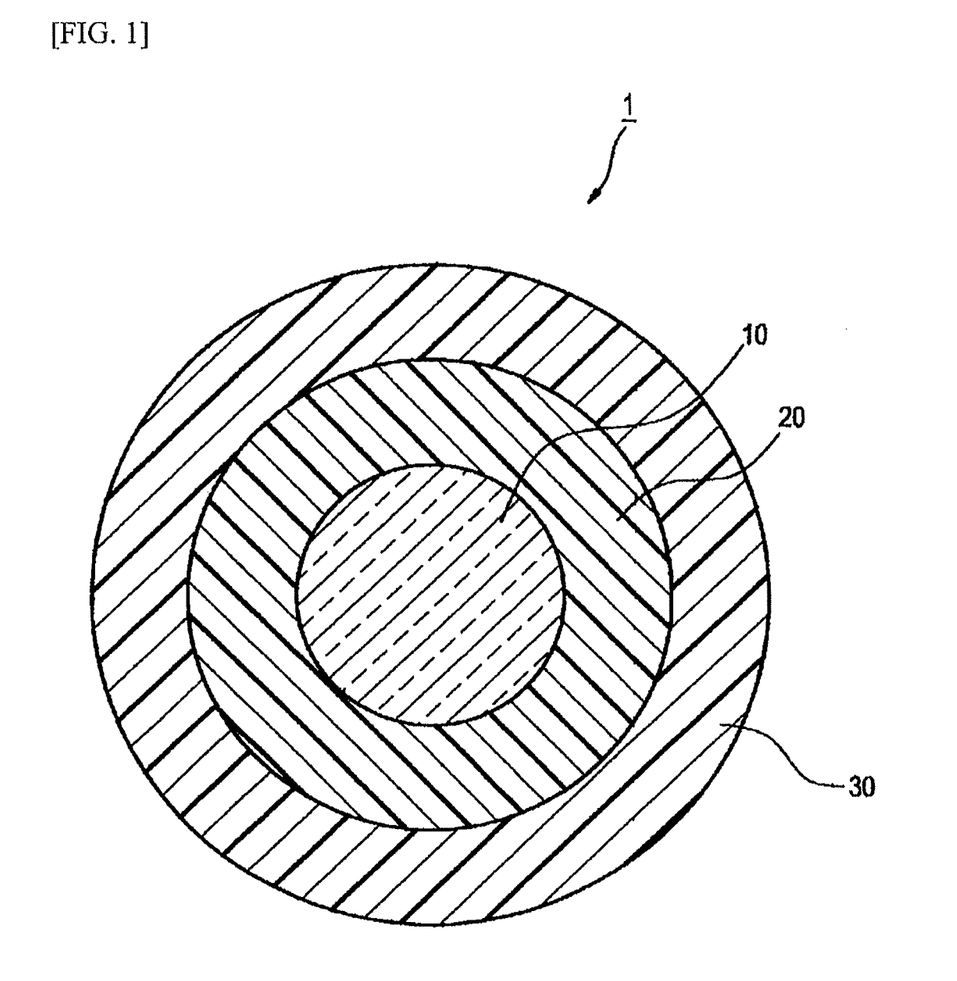
FIG. 1 This is a diagrammatic cross-sectional view illustrating one example of the coated optical fiber of the present invention.

The following will describe the coated optical fiber of the present invention in detail with reference to FIG. 1.

FIG. 1 is a diagrammatic cross-sectional view illustrating one example of the coated optical fiber of the present invention.

A coated optical fiber 1 comprises a primary coating layer 20 obtained by curing an ultraviolet ray-curable resin composition on an outer periphery of an optical fiber 10 and a secondary coating layer 30 obtained by curing a curable resin further on an outer periphery thereof. A resin coating layer is formed from the primary coating layer 20 and the secondary coating layer 30.

The optical fiber 10 usually comprises a cladding layer composed of quartz glass on an outer periphery of a core layer composed of a quartz-based glass. The outer diameter of the core layer can be controlled to, for example, from 7 μm to 60 μm and the outer diameter of the cladding layer can be controlled to, for example, 125 μm.

The primary coating layer 20 is a cured resin layer formed on an outer periphery of the optical fiber 10 and, for example, the thickness thereof may be controlled to from 10 μm to 50 μm. The secondary coating layer 30 is a cured resin layer formed on an outer periphery of the primary coating layer 20 and, for example, the thickness thereof may be controlled to from 10 μm to 50 μm. The thickness of the primary coating layer may be almost equal to that of the secondary coating layer. The ratio of the both can be controlled to from 5:7 to 7:5.

These coating layers are formed by curing an ultraviolet ray-curable resin composition and, as the ultraviolet ray-curable resin composition, for example, there may be mentioned one containing (A) a urethane oligomer; (B) a reactive diluent; and (C) a photopolymerization reaction initiator, and the like. In addition, the ultraviolet ray-curable resin composition can further contain (D) a surfactant.

In the present invention, by controlling the Young's modulus of the primary coating layer to 1.2 MPa or less, the Young's modulus of the secondary coating layer to 700 MPa or more, and the tin content in the primary coating layer to 70 ppm or less, both characteristics of the microbending loss resistance and the low-temperature characteristic are made excellent. The Young's modulus of the primary coating layer is controlled smaller than before for the purpose of improving the transmission loss due to microbending but, thereby, the transmission loss at low temperature increases. In the present invention, by controlling the tin content in the coating layers (especially the primary coating layer) smaller (70 ppm or less) than before as well as controlling the Young's modulus of the primary coating layer smaller (1.2 MPa or less) than before, the above both characteristics are made excellent. Since influence of the primary coating layer nearer to glass is larger than influence of the secondary coating layer on the transmittance characteristic of an optical fiber at low temperature, it is effective for suppressing the increase in the transmission loss at low temperature to control the tin content in the primary coating layer to 70 ppm or less. It is further effective for suppressing the increase in the transmission loss at low temperature to control the tin contents in a combination of both layers (hereinafter also simply referred to as a "coating layer") of the primary coating layer and the secondary coating layer to 70 ppm or less.

The cushioning effect increases as the Young's modulus of the primary coating layer decreases and the microbending loss tends to be alleviated but, for obtaining a coated optical fiber having mechanical strength durable for use, it is preferable to control the Young's modulus of the primary coating layer to 0.2 MPa or more. There is a tendency that the mechanical strength of the coated optical fiber increases as the Young's modulus of the secondary coating layer increases but, when the Young's modulus of the secondary coating layer is exceedingly large, the optical fiber becomes rigid and is difficult to handle. In this respect, it is preferable to control the Young's modulus of the secondary coating layer to 1,500 MPa or less.

Incidentally, the Young's modulus and the tin content of the coating layer are measured by the following methods.

Young's modulus of primary coating layer: It is measured by the Pullout Modulus test at 23° C. Specifically, the coating layer of the optical fiber is nicked with a razor or the like to cut the resin coating layer and the glass fiber is pulled out while the resin coating layer (primary coating layer and secondary coating layer) is fixed. A stress of the primary coating layer is determined from a degree of elastic deformation of the primary coating layer and a force for drawing the glass fiber before the glass fiber is pulled out.

Young's modulus of secondary coating layer: A sample (50 mm or more) obtained by immersing the optical fiber in a solvent (ethanol:acetone=3:7) and pulling the primary coating layer and the secondary coating layer together as a pipe out of the glass is subjected to a tensile test (marked line: 25 mm) and the modulus is determined from a 2.5% secant value.

Tin content in coating layer: It is calculated based on ICP emission analysis. Specifically, 20 ml of sulfuric acid/6 ml of nitric acid are added to 1 g of a sample, followed by heating for 10 minutes. Thereafter, 4 ml of perchloric acid is added thereto and the whole is heated until insoluble matter disappears. Then, the volume is made constant to 100 ml and measurement is performed on ICP (an emission analyzer using high-frequency inductively coupled plasma as a light source). When the sample is the primary coating layer alone or the secondary coating layer alone, the tin content in each layer can be determined.

(Ultraviolet Ray-Curable Resin Composition that Forms Coating Layer)

For the ultraviolet ray-curable resin such as (A) the urethane oligomer contained in the ultraviolet ray-curable resin composition that forms the coating layer of the coated optical fiber of the present invention, a tin compound catalyst may be used in the production process and thus the tin compound catalyst mixes into the urethane oligomer.

In addition, as (C) the photopolymerization reaction initiator contained in the ultraviolet ray-curable resin composition, one containing phosphorus is suitably used since it has the advantage of excellence in curability.

It is considered that the low-temperature characteristic of the coated optical fiber becomes worse as a result of the reaction of the tin component contained in (A) the urethane oligomer and the phosphorus component contained in (C) the photopolymerization reaction initiator in the ultraviolet ray-curable resin composition. In the present invention, the tin content in the primary coating layer can be reduced by suppressing the tin mixing into (A) the urethane oligomer in the ultraviolet ray-curable resin composition. For the purpose, it is preferable to reduce the amount of the tin compound catalyst to be used as far as possible in the production of (A) the urethane oligomer. In the present invention, the tin content in the primary coating layer is preferably 50 ppm or less and furthermore, the total tin content in the primary coating layer and the secondary coating layer is preferably 50 ppm or less. It is preferable to control both tin contents in the primary coating layer and the secondary coating layer to 10 ppm or more. The reason is that it is preferable to add a small amount of a tin compound as a catalyst when production efficiency of the ultraviolet ray-curable resin composition is considered. Furthermore, in the present invention, as (C) the photopolymerization reaction initiator contained in the ultraviolet ray-curable resin composition that forms the primary coating layer, a suitable phosphorus-containing initiator can be used without any concern.

The following will describe the components (A) to (D) contained in the ultraviolet ray-curable resin composition that forms the coating layer of the coated optical fiber of the present invention in detail.

(A) the urethane oligomer is not particularly limited so long as the mixed amount of a tin compound thereof can satisfy the tin content range in the coating layer defined in the present invention but a reactive oligomer containing a (meth)acryloyl group that is a reactive group is preferred. Such a (meth)acryloyl group-containing urethane oligomer can be obtained, for example, by reacting an aliphatic polyether-based polyol, an organic polyisocyanate, a hydroxyl group-containing (meth)acrylate, and γ-mercaptopropyltrimethoxysilane. The molecular weight is preferably from about 5,000 to 30,000. Curing of the resin is performed by polymerizing (A) the (meth)acryloyl group-containing urethane oligomer with (B) the reactive diluent that is a reactive monomer. (A) the urethane oligomer is preferably contained in an amount of 60 to 80% by weight in the ultraviolet ray-curable resin composition. Particularly, it is preferred that the primary coating layer satisfies the tin content range defined in the present invention.

Examples of the aliphatic polyether-based polyol for use in the synthetic reaction of the (meth)acryloyl group-containing urethane oligomer include polyethylene glycol, polypropylene glycol, polytetramethylene glycol, polyhexamethylene glycol, polyheptamethylene glycol, polydecamethylene glycol, polyether diols obtained by ring-opening copolymerization of two or more ionically polymerizable cyclic compounds, and the like.

Examples of the ionically polymerizable cyclic compounds include cyclic ethers such as ethylene oxide, propylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyloxetane, vinyltetrahydrofuran, vinylcylcohexene oxide, phenyl glycidyl ether, butyl glycidyl ether, and benzoic acid glycidyl ester.

Specific examples of the polyether diols obtained by ring-opening copolymerization of two or more conically polymerizable cyclic compounds include binary copolymers obtained from combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, and the like; a ternary copolymer obtained from a combination of tetrahydrofuran, butene-1-oxide and ethylene oxide; and the like.

Examples of the organic polyisocyanate for use in the synthetic reaction of the (meth)acryloyl group-containing urethane oligomer include an aromatic diisocyanate, an alicyclic diisocyanate, an aliphatic diisocyanate, and the like.

Examples of the aromatic diisocyanate include 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, bis(2-isocyanatoethyl) fumarate, 6-isopropyl-1,3-phenylene diisocyanate, 4-diphenylpropane diisocyanate, tetramethylxylylene diisocyanate, and the like.

Example of the alicyclic diisocyanate include isophorone diisocyanate, methylenebis(4-cyclohenyl isocyanate), hydrogenated diphenylmethane diisocyanate, hydrogenated xylylene diisocyanate, 2,5-bis(isocyanatomethyl)-bicyclo[2.2.1]heptane, 2,6-bis(isocyanatomethyl)-bicyclo[2.2.1]heptane, and the like. Examples of the aliphatic diisocyanate include 1,6-hexane diisocyanate, 2,2,4-trimethylhexamethylene diisocyanate, lysine diisocyanate, and the like. Of these, in view of economical efficiency and obtainability of compositions with stable quality, aromatic diisocyanates are more preferred and 2,4-tolylene diisocyanate and 2,6-tolylene diisocyanate are particularly preferred. These organic polyisocyanates may be used solely or two or more thereof may be used in combination.

As the hydroxyl group-containing (meth)acrylate for use in the synthetic reaction of the (meth)acryloyl group-containing urethane oligomer, it is preferable to use a hydroxyl group-containing (meth)acrylate in which the hydroxyl group is bonded to a primary carbon atom (hereinafter also referred to as a "primary hydroxyl group-containing (meth) acrylate") and a hydroxyl group-containing (meth)acrylate in which the hydroxyl group is bonded to a secondary carbon atom (hereinafter also referred to as a "secondary hydroxyl group-containing (meth)acrylate"). A hydroxyl group-containing (meth)acrylate in which the hydroxyl group is bonded to a tertiary carbon atom (hereinafter also referred to as a "tertiary hydroxyl group-containing (meth)acrylate") is not preferable since it is inferior in reactivity with an isocyanate group.

Examples of the primary hydroxyl group-containing (meth)acrylate include 2-hydroxyethyl(meth)acrylate, 3-hydroxypropyl(meth)acrylate, 4-hydroxybutyl(meth)acrylate, 1,6-hexanediol mono(meth)acrylate, pentaerythritol tri (meth)acrylate, dipentaerythritol penta(meth)acrylate, neopentyl glycol mono(meth)acrylate, trimethylolpropane di(meth)acrylate, trimethylolethane di(meth)acrylate, and the like.

Examples of the secondary hydroxyl group-containing (meth)acrylate include 2-hydroxypropyl(meth)acrylate, 2-hydroxybutyl(meth)acrylate, 2-hydroxy-3-phenyloxypropyl(meth)acrylate, 4-hydroxycyclohexyl(meth)acrylate, and the like. In addition, compounds obtained by the addition reaction of a glycidyl group-containing compound such as an alkyl glycidyl ether, allyl glycidyl ether, or glycidyl (meth)acrylate with (meth)acrylic acid are also mentioned.

The oligomer may contain a urethane oligomer containing no (meth)acryloyl group obtained by reacting a polyether-based polyol, an organic polyisocyanate, and a monohydric alcohol. As the monohydric alcohol, there may be mentioned methanol, ethanol, n-propanol, i-propanol, n-butanol, i-butanol, t-butanol, and the like, and methanol or ethanol is preferred.

(B) the reactive diluent is not particularly limited and not only a monofunctional reactive diluent (a compound having one ethylenic unsaturated group) but also a polyfunctional reactive diluent (a compound having two or more ethylenic unsaturated groups) can be adopted and the blend ratio of the both can be also adjusted.

Specific examples of the monofunctional reactive diluent include vinyl group-containing lactams such as N-vinylpyrrolidone and N-vinylcaprolactam, alicyclic structure-containing (meth)acrylates such as isobornyl(meth)acrylate, bornyl(meth)acrylate, tricyclodecanyl(meth)acrylate, dicyclopentanyl(meth)acrylate, dicyclopentenyl(meth)acrylate, and cyclohexyl(meth)acrylate, benzyl(meth)acrylate, 4-butylcyclohexyl(meth)acrylate, acryloylmorpholine, vinylimidazole, vinylpyridine, and the like. Furthermore, 2-hydroxyethyl(meth)acrylate, 2-hydroxypropyl(meth)acrylate, 4-hydroxybutyl acrylate, stearyl(meth)acrylate, isostearyl (meth)acrylate, tetrahydrofurfuryl(meth)acrylate, polyethylene glycol mono(meth)acrylate, polypropylene glycol mono (meth)acrylate, methoxyethylene glycol(meth)acrylate, ethoxyethyl(meth)acrylate, methoxypolyethylene glycol (meth)acrylate, methoxypolypropylene glycol(meth)acrylate, diacetone(meth)acrylamide, isobutoxymethyl(meth) acrylamide, N,N-dimethyl(meth)acrylamide, t-octyl(meth) acrylamide, dimethylaminoethyl(meth)acrylate, diethylaminoethyl(meth)acrylate, 7-amino-3,7-dimethyloctyl(meth)acrylate, N,N-diethyl(meth)acrylamide, N,N-dimethylaminopropyl(meth)acrylamide, hydroxybutyl vinyl ether, vinyl ether, cetyl vinyl ether, alkoxylated nonylphenol acrylate, 2-(2-ethoxyethoxy)ethyl acrylate, isodecyl acrylate, isooctyl acrylate, 2-ethylhexyl vinyl ether, vinyloxyethoxyethyl(meth)acrylate, and vinyloxyethyl(meth)acrylate.

Specific examples of the polyfunctional reactive diluent include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropanetrioxyethyl(meth)acrylate, tris(2-hydroxyethyl) isocyanurate tri(meth)acrylate, tris(2-hydroxyethyl) isocyanurate di(meth)acrylate, tricyclodecane dimethanol di(meth)acrylate, a di(meth)acrylate of a diol of an ethylene oxide or propylene oxide adduct of bisphenol A, a di(meth)acrylate of a diol of an ethylene oxide or propylene oxide adduct of hydrogenated bisphenol A, an epoxy(meth)acrylate in which a (meth)acrylate is added to diglycidyl ether of bisphenol A, triethylene glycol divinyl ether, and the like.

Here, (B) the reactive diluent is preferably contained in an amount of 20 to 40% by mass in the ultraviolet ray-curable resin composition. Moreover, as for the mass ratio of the monofunctional reactive diluent to the polyfunctional reactive diluent, in the ultraviolet ray-curable resin composition that forms the primary coating layer, it is preferred that the ratio of the monofunctional reactive diluent is high as from 40:1 to 10:1 (monofunctional reactive diluent:polyfunctional reactive diluent). The breaking strength can be enhanced with maintaining the Young's modulus in the primary coating layer low by controlling the ratio to this blend ratio and thereby, both of the microbending resistance and the low-temperature characteristic can be more surely achieved. On the other hand, for the secondary coating layer, one having relatively large Young's modulus is used and thus the optical fiber can be protected from impact from the outside.

(C) the photopolymerization reaction initiator is preferably contained in an amount of 0.1 to 5% by mass in the ultraviolet ray-curable resin composition.

(C) the photopolymerization reaction initiator is not particularly limited but the primary coating layer is preferably formed from an ultraviolet ray-curable resin composition containing at least an acylphosphine oxide-based photopolymerization reaction initiator and the secondary coating layer is preferably formed from an ultraviolet ray-curable resin composition containing at least an acylphosphine oxide-based photopolymerization reaction initiator and an α-hydroxyacetophenone type photopolymerization reaction initiator. Example of the acylphosphine oxide-based photopolymerization reaction initiator include 2,4,6-trimethylbenzoyldiphenylphosphine oxide, bis-(2,6-dimethoxybenzoyl)-2,4,4-trimethylpentylphosphine oxide, and the like. Examples of the α-hydroxyacetophenone type photopolymerization reaction initiator include 1-hydroxycyclohexyl phenyl ketone and the like.

The amount of the unreacted photopolymerization reaction initiator in the coating layer can be determined by immersing the coating in acetone for 18 hours to extract the unreacted photopolymerization reaction initiator in the coating layer and subjecting the extracted liquid to quantitative determination on a flame photometric detector (GC-FPD).

(D) the surfactant is preferably contained in an amount of 0.1 to 1.0% by mass in the ultraviolet ray-curable resin composition.

As (D) the surfactant, a fatty acid ester-type nonionic surfactant is preferable, and a glycerin fatty acid ester, a sorbitan fatty acid ester, a polyoxyethylene sorbitan fatty acid ester, and a polyoxysorbitol fatty acid ester are particularly preferable.

EXAMPLES

The following will describe the present invention in further detail with showing results of evaluation tests using Examples according to the present invention and Comparative Examples. Incidentally, the present invention should not be construed as being limited to these Examples.

Examples 1 to 4 and Comparative Examples 1 to 3

As Examples 1 to 4 and Comparative Examples 1 to 3, each of coated optical fibers was prepared by forming a coating layer on a glass optical fiber whose core and clad were both made of glass by using an ultraviolet ray-curable resin composition suitably selected so that the Young's modulus of the primary coating layer, the Young's modulus of the secondary coating layer, and the tin content in the primary coating layer became the respective physical properties shown in the following Table 1.

Incidentally, the ultraviolet ray-curable resin composition for forming the primary coating layer is an ultraviolet ray-curable coating agent containing (A) a (meth)acryloyl group-containing urethane oligomer obtained by reacting an aliphatic polyol having a molecular weight of 3,500 or less, an organic polyisocyanate, a hydroxyl group-containing (meth)acrylate, and a γ-mercaptopropyltrimethoxysilane; (B) at least one kind of a reactive diluent having a glass transition temperature of 0° C. or lower at the time of polymerization as a single substance; and (C) a photopolymerization reaction initiator. As the photopolymerization reaction initiator of the ultraviolet ray-curable resin composition, 2,4,6-trimethylbenzoyldiphenylphosphine oxide and bis-(2,6-dimethoxybenzoyl)-2,4,4-trimethylpentylphosphine oxide were used for the primary coating layer and 2,4,6-trimethylbenzoyldiphenylphosphine oxide, bis-(2,6-dimethoxybenzoyl)-2,4,4-trimethylpentylphosphine oxide and 1-hydroxycyclohexyl phenyl ketone were used for the secondary coating layer. For the above-described coated optical fibers, the tin content in the coating layer, the microbending resistance, and the low-temperature characteristic were evaluated in the following manners. Evaluation results in Examples and Comparative Examples are collectively shown in the following Table 1.

(Tin Content in Coating Layer)

As for the tin content in each of the primary coating layer and the secondary coating layer, the tin content was measured by IPC emission analysis using, as a sample, a film formed from the ultraviolet ray-curable resin composition that formed each coating layer. As for the measurement of the total tin content in the coating layer, the tin content in a pipe-shape sample, which was the primary coating layer and the secondary coating layer together pulled out of the glass optical fiber, was measured by IPC emission analysis. Incidentally, the tin content measured by the IPC emission analysis varies little before and after curing of the ultraviolet ray-curable resin composition. Therefore, the tin content in the coating layer of the coated optical fiber to be produced can be accurately set by measuring the tin content in an ultraviolet ray-curable resin composition before the production of the coated optical fiber and using an ultraviolet ray-curable resin composition having a desired tin content.

(Microbending Resistance Evaluation Method)

As for a difference $\Delta\alpha 1$ obtained by subtracting a value of a transmission loss at a wavelength of 1,550 nm when the coated optical fiber was wound on a bobbin having a diameter of 280 mm with no sand paper from a value of a transmission loss at a wavelength of 1,550 nm when the coated optical fiber is wound on a bobbin having a diameter of 280 mm on which sand paper had been wound, evaluation was performed according to the following criteria.

| | |
|---|---|
| $\Delta\alpha 1 < 0.3$ dB/km: | A |
| $0.3 \leq \Delta\alpha 1 < 0.5$ dB/km: | B |
| $\Delta\alpha 1 > 0.5$ dB/km: | C |

(Low-Temperature Characteristic Evaluation Method>

As for a difference $\Delta\alpha 2$ in the transmission characteristic value at a wavelength of 1,550 nm between those stored at a temperature of $-60°$ C. and at a temperature of 25° C. at a relative humidity of 85% for 120 days ((transmission loss at $-60°$ C.)−(transmission loss at 25° C.)), evaluation was performed according to the following criteria. The coated optical fiber was measured in a bundle state (a state that it was not wound on a bobbin).

| | |
|---|---|
| $\Delta\alpha 2 \leq 0.01$ dB/km: | A |
| $\Delta\alpha 2 \leq 0.03$ dB/km: | B |
| $\Delta\alpha 2 > 0.03$ dB/km: | C |

TABLE 1

| | Example 1 | Example 2 | Example 3 | Example 4 | Comparative Example 1 | Comparative Example 2 | Comparative Example 3 |
|---|---|---|---|---|---|---|---|
| Young's modulus of primary coating layer (MPa) | 1.2 | 1 | 0.8 | 1.2 | 1.2 | 1.4 | 1.2 |
| Young's modulus of secondary coating layer (MPa) | 700 | 800 | 900 | 700 | 600 | 900 | 700 |
| Tin content in primary coating layer (ppm) | 70 | 70 | 70 | 70 | 100 | 100 | 100 |
| Tin content in secondary coating layer (ppm) | 70 | 70 | 70 | 80 | 100 | 100 | 100 |
| Microbending characteristic | B | A | A | B | C | C | B |
| Low-temperature characteristic | B | B | B | B | C | C | C |

Size in Each Example or Comparative Example

Cladding diameter: 125 μm

Thickness of primary coating layer: 32.5 μm

Thickness of secondary coating layer: 30 μm

Examples 5 to 8 and Comparative Examples 4 to 7

Figure 2:
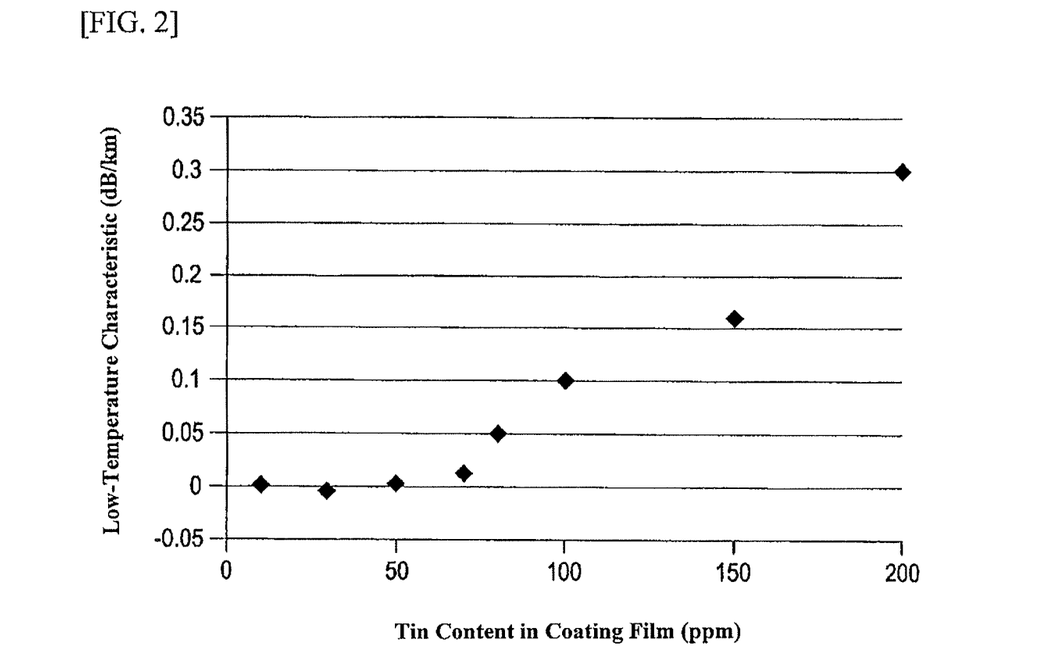
FIG. 2 This is a graph showing the results of investigation on the relationship between the tin content in the primary coating layer and the low-temperature characteristic in Examples 5 to 8 and Comparative Examples 4 to 7.

The relationship between the tin content in the coating layer and the low-temperature characteristic was investigated. Results are shown in FIG. 2. Incidentally, the Young's modulus of the primary coating layer was controlled to 1.2 MPa, the Young's modulus of the secondary coating layer was controlled to 800 MPa, and the tin content in each layer of the primary coating layer and the secondary coating layer was controlled to 10 ppm, 30 ppm, 50 ppm, and 70 ppm in Examples 5 to 8, respectively, and is controlled to 80 ppm, 100 ppm, 150 ppm, and 200 ppm in Comparative Examples 4 to 7, respectively. The cladding diameter was controlled to 125 μm, the thickness of the primary coating layer was controlled to 32.5 μm, and the thickness of the secondary coating layer was controlled to 30 μm.

From the above results, it has been confirmed that the coated optical fibers having prescribed physical property values as the Young's modulus of the primary coating layer, the Young's modulus of the secondary coating layer, and the tin content in the coating layer are satisfactory in both of the microbending resistance and the low-temperature characteristic.

On the other hand, in the coated optical fibers having no prescribed physical property value as any of the Young's modulus of the primary coating layer, the Young's modulus of the secondary coating layer, and the tin content in the coating layer, there was obtained a result that either of the microbending resistance and the low-temperature characteristic is not satisfactory. In detail, in Comparative Examples 1 to 3, tin concentration in the coating layer was high and the low-temperature characteristic was ineligible (C). In Comparative Example 1, furthermore, the Young's modulus of the secondary coating layer was low, so that the microbending loss was ineligible (C). In Comparative Example 2, furthermore, the Young's modulus of the primary coating layer was high, so that the microbending loss was ineligible (C). Moreover, from FIG. 2, when the tin content in the coating layer is 70 ppm or less with the value being a border, the low-temperature characteristic is satisfactory, while when the tin content exceeds 70 ppm, an increase in the transmission loss of the optical fibers at low temperature sharply increases (the graph rises up). It has been realized that an increase in the transmission loss at low temperature can be made almost zero when the tin content is from 10 to 50 ppm.

Examples 9 and 10

The relationship of the amount of the unreacted initiator in the coating layer was investigated. Results are shown in Table 2. Incidentally, the Young's modulus of the primary coating layer was controlled to 0.8 MPa, the Young's modulus of the secondary coating layer was controlled to 900 MPa, and the tin content in each layer of the primary coating layer and the secondary coating layer was both controlled to 70 ppm.

TABLE 2

|  | Example 9 | Example 10 |
|---|---|---|
| Young's modulus of primary coating layer (MPa) | 0.8 | 0.8 |
| Young's modulus in secondary coating layer (MPa) | 900 | 900 |
| Tin content in primary coating layer (ppm) | 70 | 70 |
| Tin content of secondary coating layer (ppm) | 70 | 70 |
| Amount of unreacted initiator (wt %) | 0.5 | 0.35 |
| Microbending characteristic | A | A |
| Low-temperature characteristic | B | A |

When the amount of the unreacted initiator in the coating layer became 0.5% by mass, the low-temperature characteristic became satisfactory. When the amount of the unreacted initiator in the coating layer was 0.35% by mass, the low-temperature characteristic became more satisfactory. It is considered that the low-temperature characteristic becomes better when the unreacted initiator decreases. Therefore, the amount is preferably 0.5% by mass or less in view of the low-temperature characteristic and an amount of 0.35% by mass or less is preferable since the low-temperature characteristic becomes extremely satisfactory While the present invention has been described in detail and with reference to specific embodiments thereof, it will be apparent to one skilled in the art that various changes and modifications can be made therein without departing from the spirit and scope thereof.

The present application is based on Japanese Patent Application (No. 2013-084093) filed on Apr. 12, 2013, and the contents are incorporated herein by reference. Also, all the references cited herein are incorporated as a whole.

DESCRIPTION OF REFERENCE NUMERALS AND SIGNS

1: Coated optical fiber
10: Optical fiber
20: Primary coating layer
30: Secondary coating layer

The invention claimed is:

1. A coated optical fiber comprising an optical fiber that has a cladding layer composed of glass formed on an outer periphery of a glass core, a primary coating layer that coats an outer periphery of the optical fiber, and a secondary coating layer that coats an outer periphery of the primary coating layer,
wherein the primary coating layer has a Young's modulus of 1.2 MPa or less, the secondary coating layer has a Young's modulus of 700 MPa or more, and the primary coating layer contains tin in a content of 10 ppm or more and 70 ppm or less and
wherein the primary coating layer is formed from an ultraviolet ray-curable resin composition containing an acylphosphine oxide-based photopolymerization reaction initiator but not a bisacylphosphine oxide-series photopolymerization initiator.

2. The coated optical fiber according to claim 1, wherein the total tin content in the primary coating layer and the secondary coating layer is 10 ppm or more and 70 ppm or less.

3. The coated optical fiber according to claim 1, wherein the tin content in the primary coating layer is 10 ppm or more and 50 ppm or less.

4. The coated optical fiber according to claim 3, wherein the total tin content in the primary coating layer and the secondary coating layer is 10 ppm or more and 50 ppm or less.

5. The coated optical fiber according to claim 1, wherein the Young's modulus of the primary coating layer is 1.0 MPa or less and the Young's modulus of the secondary coating layer is 800 MPa or more.

6. The coated optical fiber according to claim 1, wherein the Young's modulus of the primary coating layer is 0.80 MPa or less and the Young's modulus of the secondary coating layer is 900 MPa or more.

7. The coated optical fiber according to claim 1, wherein the coating layer contains an unreacted acylphosphine oxide-based photopolymerization reaction initiator in an amount of 0.5% by mass or less.

8. The coated optical fiber according to claim 1, wherein the primary coating layer is formed from an ultraviolet ray-curable coating agent containing:
   (A) a (meth)acryloyl group-containing urethane oligomer obtained by reacting an aliphatic polyol, an organic polyisocyanate, a hydroxyl group-containing (meth)acrylate, and a γ-mercaptopropyltrimethoxysilane;
   (B) a reactive diluent; and
   (C) a photopolymerization reaction initiator.

9. The coated optical fiber according to claim 1, wherein the primary coating layer is formed from an ultraviolet ray-curable coating agent containing:
   (A) a (meth)acryloyl group-containing urethane oligomer obtained by reacting an aliphatic polyol having a molecular weight of 3,500 or less, an organic polyisocyanate, a hydroxyl group-containing (meth)acrylate, and a γ-mercaptopropyltrimethoxysilane;
   (B) at least one kind of a reactive diluent having a glass transition temperature of 0° C. or lower at the time of polymerization as a single substance; and
   (C) a photopolymerization reaction initiator.

10. The coated optical fiber according to claim 1, wherein a difference in the transmission loss at a wavelength of 1550 nm between those stored at a temperature of −60° C. and at a temperature of 25° C. at a relative humidity of 85% for 120 days is 0.03 dB/km or less.

11. The coated optical fiber according to claim 1, wherein the photopolymerization reaction initiator is 2,4,6-trimethylbenzoyldiphenylphosphine oxide.

* * * * *